No. 620,814. Patented Mar. 7, 1899.
C. WARREN.
SHAFT COUPLING.
(Application filed Aug. 31, 1897.)

(No Model.)

Witnesses
C. L. Whipple
E. Hussey

Charles Warren
Inventor
by Chandler Chandler
Attorneys

THE NORRIS PETERS CO., PHOTO-LITHO., WASHINGTON, D. C.

UNITED STATES PATENT OFFICE.

CHARLES WARREN, OF WOLF, CALIFORNIA.

SHAFT-COUPLING.

SPECIFICATION forming part of Letters Patent No. 620,814, dated March 7, 1899.

Application filed August 31, 1897. Serial No. 650,193. (No model.)

*To all whom it may concern:*

Be it known that I, CHARLES WARREN, a citizen of the United States, residing at Wolf, in the county of Nevada, State of California, have invented certain new and useful Improvements in Shaft-Couplings; and I do hereby declare the following to be a full, clear, and exact description of the invention, such as will enable others skilled in the art to which it appertains to make and use the same.

My invention relates to shaft-couplings in general, and more particularly to that class in which a coupling may be employed to hold the sections of a shaft to turn in unison or may allow them to turn independently and yet preserve their alinement and location.

Figure 1:
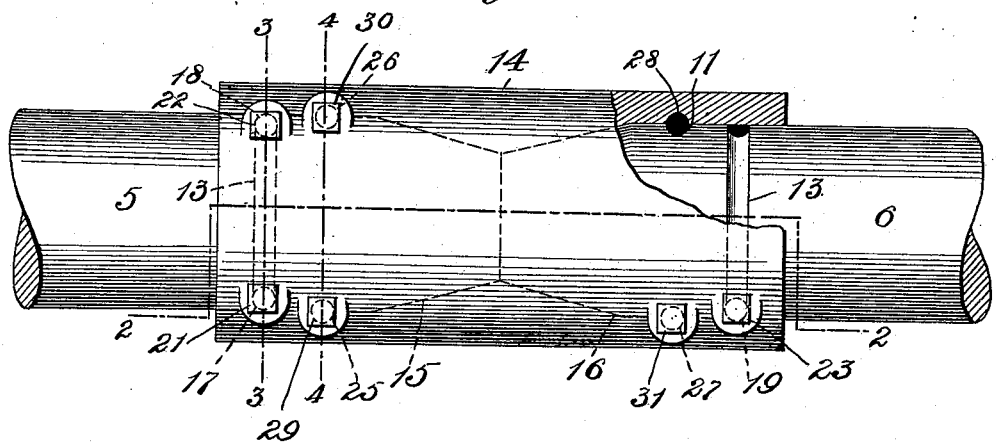
Figure 2:
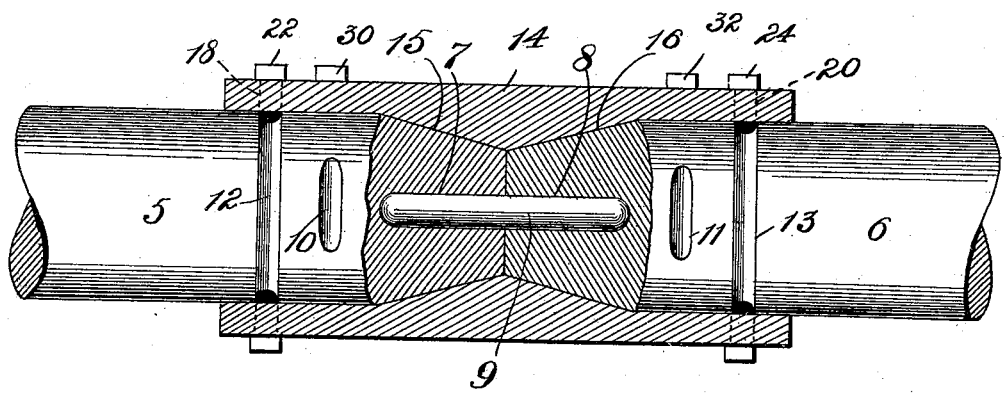
Figure 3:
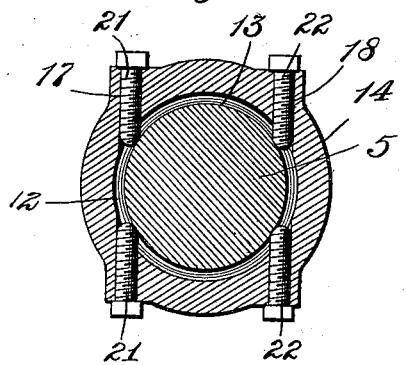
Figure 4:
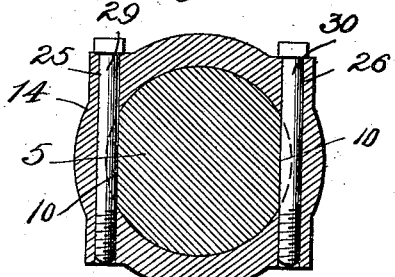

In the drawings forming a portion of this specification, and in which like figures of reference indicate similar parts in the several views, Figure 1 is a plan view of my coupling as applied to the meeting ends of two shaft-sections. Fig. 2 is a section on line 2 2 of Fig. 1. Fig. 3 is a section on line 3 3 of Fig. 1. Fig. 4 is a section on line 4 4 of Fig. 1.

Referring now to the drawings, in operating in accordance with my invention I turn down the adjacent ends of the shaft-sections 5 and 6 to be connected, so that such ends will be frusto-conical, as shown, and in the ends I form cylindrical openings 7 and 8 in mutual alinement and coincident with the common axes of the shaft-sections, the object of such openings being to receive a dowel-pin 9, which, while maintaining the alinement of the shaft-sections, permits their independent turning.

Outwardly of the narrowed ends of the sections 5 and 6 and on opposite sides thereof are formed transverse grooves 10 and 11, for a purpose presently explained, and adjacent to and beyond these grooves are formed annular grooves 12 and 13.

Inclosing the ends of the sections 5 and 6 is a cylindrical sleeve 14, the interior of which is cylindrical at its ends to correspond with the adjacent portions of the shaft-sections, the central portion of the interior of such sleeve being narrowed, as shown at 15 and 16, to correspond to the narrowed portions of the shaft-sections.

Formed in the sleeve 14 and opening into the grooves 12 and 13 are screw-threaded perforations 17, 18, 19, and 20, adapted to receive screws 21 and 22 and 23 and 24, which latter enter the grooves 12 and 13 and, while permitting independent rotation of the shaft-sections, prevent their longitudinal displacement. Additional perforations 25, 26, 27, and 28 are formed in the sleeve 14, which said perforations coincide with the grooves 10 and 11, respectively, to form continuous perforations from one side of the sleeve to the other. The object of the latter perforations and grooves is to receive bolts 29, 30, 31, and 32, their screw-threaded ends engaging the threads of the perforations 26 and 28 to prevent withdrawal of the bolts, the effect of such bolts being to prevent independent rotation of the shaft-sections, as will be readily seen.

It will readily be understood that I may vary the location and arrangement of the several screws and perforations above mentioned without departing from the spirit of my invention.

Having thus described my invention, what I claim is—

1. The combination with adjacent shaft-sections each having an annular groove and a transverse groove, of a sleeve provided with perforations opening into said grooves, screws carried by the sleeve and entering the grooves, and bolts passed through other perforations and the grooves in alinement therewith.

2. The combination with adjacent shaft-sections having longitudinal axial openings and also provided with annular and transverse grooves, of a pin entering said openings, a sleeve surrounding the ends of the sections, and having openings leading into said grooves, screws carried by the sleeve and entering certain grooves and bolts passing through other openings in the sleeve and lying in the transverse grooves of the shaft-sections.

3. The combination with shaft-sections having tapered ends and longitudinal axial openings and provided with annular and transverse grooves, of a loose pin in said openings, a sleeve surrounding the sections and having its bore centrally reduced and tapered to conform to the ends of the shaft-sections, screws carried by the sleeve and entering certain grooves of the sections, and bolts passed through openings in the sleeve and the remaining grooves in the sections.

In testimony whereof I affix my signature in presence of two witnesses.

CHARLES WARREN.

Witnesses:
N. MILLS,
J. W. GILBERT.